Sept. 17, 1946.     O. HERWICK ET AL     2,407,783
LAWN MOWER SHARPENER
Filed April 17, 1945
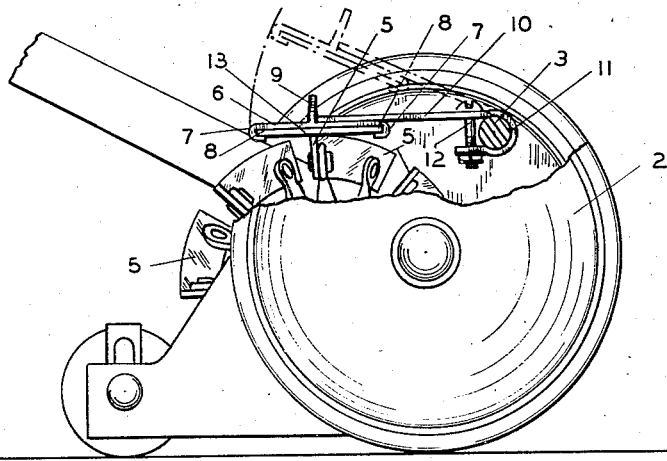
*Fig 1*
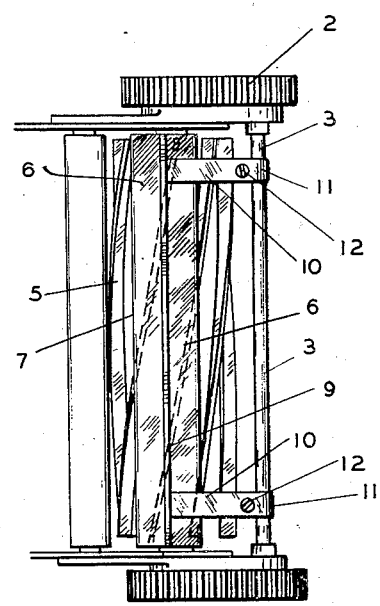
*Fig 2*
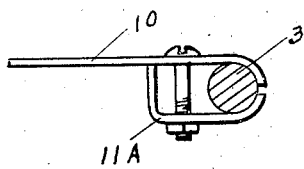
*Fig 4*
*Fig 3*
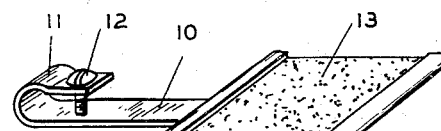
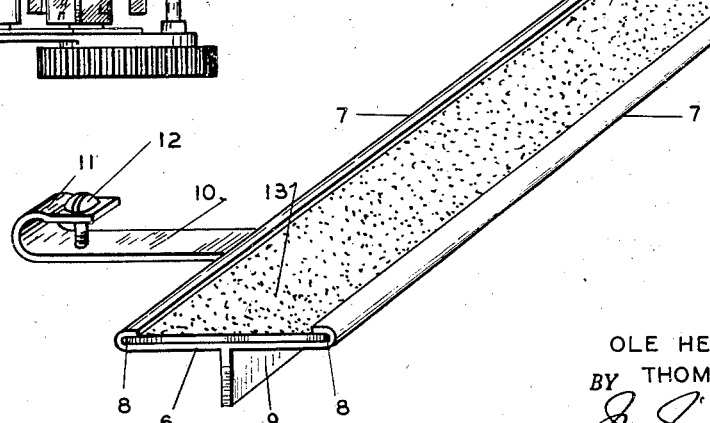
INVENTORS
OLE HERWICK
BY THOMAS M. TAYLOR
ATTORNEY

UNITED STATES PATENT OFFICE 2,407,783
LAWN MOWER SHARPENER

Ole Herwick and Thomas M. Taylor,
Portland, Oreg.

Application April 17, 1945, Serial No. 588,856

1 Claim. (Cl. 51—250)

This invention relates to lawn mower sharpening devices and is particularly adapted to be affixed to a lawn mower ready for instant use.

The primary object of the invention is to provide a sharpening device that is mounted upon the lawn mower and that can be brought into contact with the lawn mower blades when it is desired to sharpen them.

A further object of the invention is the provision of a sharpening device, having removable abrasive sheet mounted therein.

A still further object of the invention is to so mount the sharpener to the lawn mower so that it can be disengaged from contact with the cutting blades while not being used to sharpen the blades and will still be affixed to and forming part of the lawn mower.

These and other incidental objects will be apparent in the drawing, specification and claim.

Referring to the drawing:

Figure 1 is an end view of a lawn mower having our new and improved sharpening device mounted thereon, illustrating it in position for sharpening the blades, parts of the lawn mower are broken away for convenience of illustration.

Figure 2 is a plan view of the lawn mower showing the sharpening device mounted thereon and in sharpening position.

Figure 3 is a perspective end view of the sharpener removed from the mower illustrating its mechanical construction.

Figure 4 is another preferred form of clamp for holding the sharpener to the mower.

In the drawing:

1 represents a conventional lawn mower assembly which consists of the supporting and driving wheels 2, having the usual spacing rod 3 bridging between the outer ends of the mower. A cutting rotor is provided with the usual blades 5 forming part thereof. Our sharpening device consists of a frame 6, having its edges rolled at 7 providing a longitudinal groove 8 along each of its sides.

The frame 6 has a stiffener 9 running throughout its length maintaining the farme in alignment. Extending outwardly from the frame 6 are brackets 10 terminating in loops 11. These brackets are affixed to the frame in any suitable manner and provide means for holding the device to the mower.

The loops 11 are mounted to the cross rod 3 of the lawn mower and are clamped thereon by the bolts 12, which are tightened to the proper amount for holding the frame 6 against the cutter blades 5, with the proper pressure for grinding the blades. An abrasive element 13, such as sandpaper or emery cloth is mounted within the grooves 8 and held therein by friction. These abrasive sheets may be removed from time to time, thereby providing a very efficient sharpening device, one that is simple and efficient in operation.

We will now describe the operation of our new and improved sharpening device. When the sharpener is not in use it is rotated about the cross rod 3, as indicated by the dotted position, where it will remain out of contact with the cutter blades 5. When it is desired to sharpen the blades the device is revolved about the cross rod 3 to the position illustrated in the drawing, the bolts 12 holding it in place against the cutter blades while the rotor of the lawn mower is being revolved. This sharpening device sharpens the blades of the mower while cutting the lawn.

A sharp blade can be maintained at all times, which has heretofore not been the case, in other words the lawn mower can be kept in the most efficient sharpened condition which is the outstanding feature of our invention.

We do not wish to be limited to the exact mechanical details as illustrated, as we realize that other mechanical equivalents may be substituted, still coming within the scope of our claim.

As stated before the primary object of our invention is to mount upon a lawn mower an abrasive element that can be brought into contact with the cutter rotor of the mower while the same is being revolved by whatever power may be applied thereto while the mower is in operation.

What we claim as new is:

A sharpening device for lawn mowers, comprising an elongated plate having return-bend longitudinal edges to form guides, an abrasive strip removably seated in said guides, arms projecting from one longitudinal edge of the plate, the ends of the arms being formed with means for pivotally connecting the plate on a fixture of the lawn mower to insure bodily swinging movement of the plate to and from the operating plane of the blades of the mower under a holding frictional grip, and a rigid rib extending lengthwise from that side of the plate opposite the abrading material, the rib being substantially in line with that portion of the abrasive strip cooperating with the mower blades when in sharpening position and resisting any bending of the blade during such cooperation.

OLE HERWICK.
THOMAS M. TAYLOR.